(12) United States Patent
Slough

(10) Patent No.: US 9,741,457 B2
(45) Date of Patent: *Aug. 22, 2017

(54) METHOD AND APPARATUS FOR THE GENERATION, HEATING AND/OR COMPRESSION OF PLASMOIDS AND/OR RECOVERY OF ENERGY THEREFROM

(75) Inventor: John T. Slough, Bellevue, WA (US)

(73) Assignee: MSNW, LLC, Redmond, WA (US)

( * ) Notice: Subject to any disclaimer, the term of this patent is extended or adjusted under 35 U.S.C. 154(b) by 573 days.

This patent is subject to a terminal disclaimer.

(21) Appl. No.: 13/201,428

(22) PCT Filed: Feb. 12, 2010

(86) PCT No.: PCT/US2010/024172
§ 371 (c)(1),
(2), (4) Date: Aug. 12, 2011

(87) PCT Pub. No.: WO2010/093981
PCT Pub. Date: Aug. 19, 2010

(65) Prior Publication Data
US 2011/0293056 A1 Dec. 1, 2011

Related U.S. Application Data

(60) Provisional application No. 61/152,221, filed on Feb. 12, 2009.

(51) Int. Cl.
*G21B 1/19* (2006.01)
*H05H 1/02* (2006.01)
*G21B 1/05* (2006.01)

(52) U.S. Cl.
CPC .............. *G21B 1/19* (2013.01); *G21B 1/052* (2013.01); *H05H 1/02* (2013.01); *Y02E 30/122* (2013.01); *Y02E 30/16* (2013.01)

(58) Field of Classification Search
CPC . H05H 1/10; H05H 1/105; H05H 1/54; G21B 1/05; G21B 1/052; Y02E 30/12
(Continued)

(56) References Cited

U.S. PATENT DOCUMENTS 3,329,864 A * 7/1967 Michel .................... H05H 1/11
313/161
4,252,605 A 2/1981 Schaffer
(Continued)

FOREIGN PATENT DOCUMENTS

EP 1641327 3/2006
WO 2010/093981 A2 8/2010
WO 2012/021537 A1 2/2012

OTHER PUBLICATIONS

Burtsev, V. A. et. al., "D-3He-Fueled Fusion Power Plant Based on the Pulsatory Field-Reversed Configuration," Fusion Technology, 21(1992), No. 4, pp. 2324-2331.*
(Continued)

*Primary Examiner* — Jack W Keith
*Assistant Examiner* — Sharon M Davis
(74) *Attorney, Agent, or Firm* — Lowe Graham Jones PLLC

(57) ABSTRACT

Method and apparatus for heating and/or compressing plasmas to thermonuclear temperatures and densities are provided. In one aspect, at least one of at least two plasmoids separated by a distance is accelerated towards the other. The plasmoids interact, for instance to form a resultant plasmoid, to convert a kinetic energy into a thermal energy. The resultant plasmoid is confined in a high energy density state using a magnetic field. One or more plasmoids may be compressed. Energy may be recovered, for example via a blanket and/or directly via one or more coils that create a magnetic field and/or circuits that control the coils.

18 Claims, 8 Drawing Sheets

(58) Field of Classification Search
USPC .................................. 376/121, 107, 120, 124
See application file for complete search history.

(56) References Cited

U.S. PATENT DOCUMENTS

| | | | |
|---|---|---|---|
| 4,263,095 A | | 4/1981 | Thode |
| 4,267,488 A | * | 5/1981 | Wells ...................... G21B 1/00 376/107 |
| 4,274,919 A | | 6/1981 | Jensen et al. |
| 4,314,879 A | | 2/1982 | Hartman et al. |
| 4,397,810 A | | 8/1983 | Salisbury ...................... 376/107 |
| 4,735,762 A | | 4/1988 | Lasche |
| 5,339,336 A | * | 8/1994 | Sudan ...................... H05H 9/00 376/107 |
| 5,923,716 A | | 7/1999 | Meacham ...................... 376/121 |
| 7,391,160 B2 | | 6/2008 | Monkhorst et al. |
| 7,486,758 B1 | | 2/2009 | Turchi |
| 2002/0080904 A1 | * | 6/2002 | Rostoker ................ G21B 1/052 376/107 |
| 2002/0101949 A1 | | 8/2002 | Nordberg |
| 2008/0069287 A1 | | 3/2008 | Monkhorst et al. |
| 2010/0020913 A1 | | 1/2010 | Mozgovoy |
| 2012/0027151 A1 | | 2/2012 | Bystriskii et al. |
| 2012/0031070 A1 | | 2/2012 | Slough et al. |
| 2014/0023170 A1 | | 1/2014 | Slough |

OTHER PUBLICATIONS

Seife, Charles "Sun in a Bottle" © 2008, Chapters 9 and 10.*
Close, Frank "Too Hot to Handle: The Race for Cold Fusion" © 1991.*
Francis, Matthew "Fusion reactor achieves tenfold increase in plasma confinement time" Ars Technica Nov. 2013.*
Aymar, R. et al. "Overview of ITER-FEAT—The future international burning plasma experiment" Nuclear Fusion, vol. 41, No. 10, pp. 1301-1310.*
Slough et al., "The Pulsed High Density Experiment: Concept, Design, and Initial Results," Journal of Fusion Energy 26(1/2):199-205, Jun. 2007.
Slough et al., "Creation of a High Temperature Plasma Through Merging and Compression of Supersonic Field Reversed Configuration Plasmoids," Nuclear Fusion 51(5), May 2011, 18 pages.
"Plasma Stability," Wikipedia, the Free Encyclopedia, URL=http://en.wikipedia.org/wiki/Plasma_stability, download date Feb. 11, 2009, 4 pages.
"Magnetohydrodynamics," Wikipedia, the Free Encyclopedia, URL=http://en.wikipedia.org/wiki/Magnetohydrodynamic, download date Feb. 11, 2009, 8 pages.
International Search Report, mailed Oct. 13, 2010, for PCT/US2010/024172, 6 pages.
Written Opinion, mailed Oct. 13, 2010, for PCT/US2010/024172, 4 pages.
Burtsev et al., "D-$^3$He-Fueled Fusion Power Plant Based on the Pulsatory Field-Reversed Configuration," Fusion Technology 21(4):2324-2331, Jul. 1992.
Woodruff et al., "Adiabatic Compression of a Doublet Field Reversed Configuration (FRC)," J Fusion Energ 27:128-133, 2008.
Votroubek et al., "Formation of a Stable Field Reserved Configuration through Merging," J Fusion Energ 27:123-127, 2008.
European Search Report, mailed Oct. 30, 2013, for corresponding EuropeanApplication No. 10741837.8, 6 pages.
Degnan et al., "Implosion of Solid Liner for Compression of Field Reversed Configuration," IEEE Transactions on Plasma Science 29(1):93-98, Feb. 2001.
Gota et al., "A Well-Confined Field Reversed Configuration Plasma Formed by Dynamic Merging of Two Colliding Compact Toroids in C-2," Innovative Confinement Concepts (ICC) & US-Japan Compact Torus Plasma (CT) Workshops, Seattle, WA, Aug. 16, 2011, 19 pages.

Grabowski et al., "FRC Compression Heating Experiment (FRCHX) at AFRL," IEEE 34$^{th}$ International Conference on Plasma Science, Albuquerque, NM, Jun. 17-22, 2007, p. 980.
Grabowski et al., "FRC Lifetime Studies For The Field Reversed Configuration Heating Experiment (FRCHX)," IEEE Pulsed Power Conference, Chicago, IL, Jun. 19-23, 2011, pp. 431-436.
Intrator et al., "A High Density Field Reversed Configuration Plasma for Magnetized Target Fusion," TPS0200 Special Issue on Plenary/Invited Talks from ICOPS 2003, Feb. 2004, 10 pages.
Intrator et al., "Applications of predictions for FRC translation to MTF," FRC scaling xltn & comprssn, Aug. 17, 2007, 9 pages.
Kirtley et al., "Macron Formed Liner as a Practical Method for Enabling Magneto-Inertial Fusion," J Fusion Energ 29:561-566, 2010.
Sijoy et al., "Conversion of plasma energy into electrical pulse by magnetic flux compression," Fusion Engineering and Design 86:174-182, 2011.
Slough et al., "Creation of a high-temperature plasma through merging and compression of supersonic field reversed configuration plasmoids," Nucl. Fusion 51:053008, 2011, 10 pages.
Slough et al., "Flux generation and sustainment of a field reversed configuration with rotating magnetic field current drive," Physics of Plasmas 7(5):1945-1950, May 2000.
Slough et al., "Pulsed Plasmoid Propulsion: The ELF Thruster," 31$^{st}$ International Electric Propulsion Conference, Ann Arbor, Michigan, Sep. 20-24, 2009, 24 pages.
Slough, "Nuclear Propulsion based on Inductively Driven Liner Compression of Fusion Plasmoids," 49$^{th}$ AIAA Aerospace Sciences Meeting including the New Horizons and Aerospace Exposition, Orlando, Florida, Jan. 4-7, 2011, 8 pages.
Votroubek et al., "The Plasma Liner Compression Experiment," J Fusion Energ 29:571-576, 2010.
Wurden et al., "FRCHX Magnetized Target Fusion HEDLP Experiments," 22$^{nd}$ IAEA Fusion Energy Conference, Geneva, Switzerland, Oct. 13-18, 2008, 9 pages.
Wurden et al., "FRX-L: A Plasma Injector for Magnetized Target Fusion," Physics Division Los Alamos National Laboratory, LALP-03-174, 2003, 4 pages.
Zakharov et al., "Direct Conversion Of The Energy Of Laser and Fusion Plasma Clouds to Electrical Energy During Expansion In A Magnetic Field," Journal of Applied Mechanics and Technical Physics 42(2):185-195, 2001.
Burtsev VA: "D-3HE-Fueled Fusion Power Plant Based on the Pulsatory Field-Reversed Configuration", Fusion Technology, American Nuclear Society. Lagrange Park, Illinois, US, vol. 21, No. 4, Jul. 1, 1992 (Jul. 1, 1992), pp. 2324-2331, XP000296862, ISSN: 07 48-1896.
Slough et al.: "The pulsed high density experiment: concept, design and initial results", Journal of Fusion Energy, vol. 26, No. 1/2, Jun. 2007 (Jun. 2007), pp. 199-205, XP002714439, DOI: 10.1007/s1 0894-006-9058-x.
Woodruff et al.: "Adiabatic compression of a doublet field reversed configuration (FRC)", Journal of Fusion Energy, vol. 27, No. 1, Jun. 2008 (Jun. 2008), pp. 128-133, XP002714440, USA, ISSN: 0164-0313, DOI: 10.1 007/s1 0894-007-9101-6.
Mogahed et al.: "A helium cooled Li20 straight tube blanket design for cylindrical geometry", Fusion Technology, vol. 39, No. 2, Mar. 2001 (Mar. 2001), pp. 639-643, USA, ISSN: 07 48-1896 XP2753681.
Howard et al., "Development of Merged Compact Torids for Use as a Magnetized Fusion Plasma," Nov. 11, 2008, 6 pages.
Harms et al., "Principles of Fusion Energy," World Scientific Publishing Co. Pte. Ltd., 2000, 7 pages.
Fermi, "Thermodynamics," Dover Publications, Inc., New York, NY, 1956, 3 pages.
Bellan, "Spheromaks: A Practical Application of Magnetohydrodynamic Dynamos and Plasma Self-Organization," Imperial College Press, 200, 6 pages.
Yamada, "Review of the recent controlled experiments for study of local reconnection physics," Earth Planets Space, vol. 53, pp. 509-519, 2001, 11 pages.

(56) References Cited

OTHER PUBLICATIONS

Ueda et al., High-power heating of spherical tori by use of magnetic reconnection, Earth Planets Space, vol. 53, pp. 527-530, 2001, 4 pages.
Laberge et al., "Experimental Results for an Acoustic Driver for MTF," Aug. 11, 2008, 4 pages.
Woodruff et al., "Adiabatic compression of compact tori," Jan. 24, 2008, 22 pages.

* cited by examiner

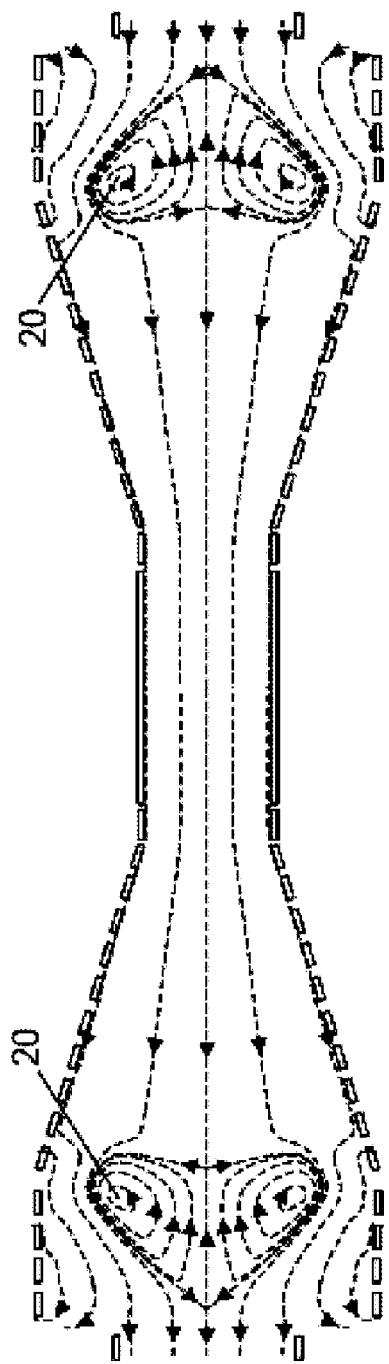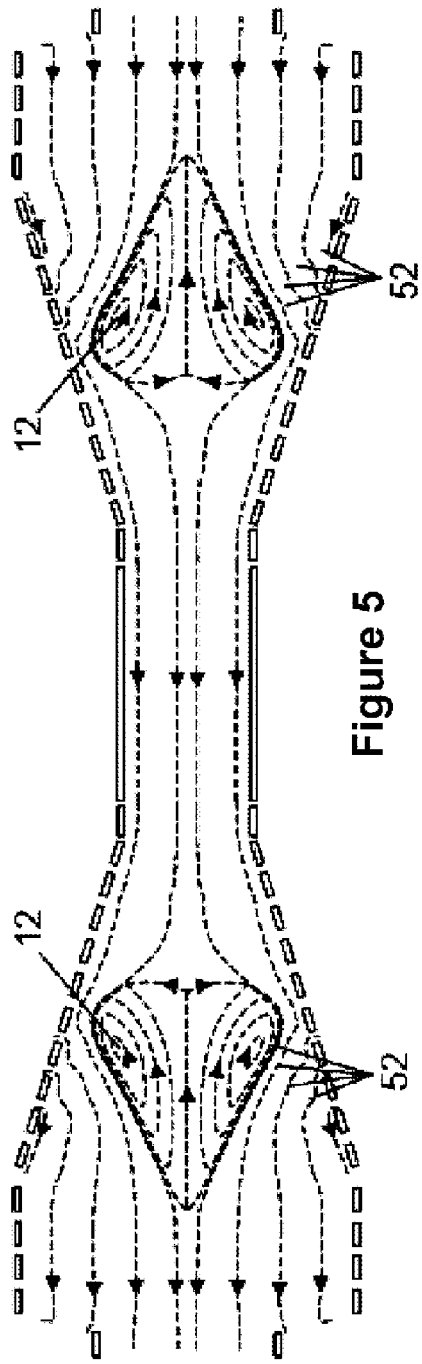
Figure 4
Figure 5

METHOD AND APPARATUS FOR THE GENERATION, HEATING AND/OR COMPRESSION OF PLASMOIDS AND/OR RECOVERY OF ENERGY THEREFROM

CROSS-REFERENCE TO RELATED APPLICATION(S)

This application is a U.S. national stage application filed under 35 U.S.C. §371 of International Patent Application PCT/US2010/024172, accorded an international filing date of Feb. 12, 2010, which claims benefit under 35 U.S.C. 119(e) to U.S. provisional patent application Ser. No. 61/152,221, filed Feb. 12, 2009, and incorporates by reference the contents of these applications in their entirety.

BACKGROUND

Technical Field

This disclosure generally relates to the field of plasma physics, and, more particularly, to methods and apparatus for heating and/or compression of plasmoids.

Description of the Related Art

There is no question that the world's demand for energy will only increase. The advancement of virtually every modern society parallels the availability of copious, low-cost energy. The tremendous change that has been made to the Earth's atmosphere, and the potential looming climate catastrophe, are a consequence of the fact that energy was obtained by the consumption of staggering quantities of fossil fuels.

The attractiveness of fusion as an energy source is well known and has been pursued as an energy source worldwide for many years. However, the entry of fusion as a viable, competitive source of power has been stymied by the challenge of finding an economical way to heat and confine the plasma fuel.

The main challenges to plasma heating and confinement are the complexity and large physical scale of the plasma confinement systems and associated heating systems. The more massive the system required to confine and heat the fusion plasma, the higher the cost to develop and operate it. One decision by the majority fusion research community that drives the scale higher is the community's selection of the tokamak embodiment for plasma fuel confinement.

The tokamak embodiment leads to large reactor sizes due to the low ratio of the plasma energy to magnetic energy and the need to operate at steady state (low power density).

The research community has also expended great effort at the other end of the energy density spectrum, pursuing fusion at extremely high energy densities. Here, minute fuel pellets are compressed to fusion conditions by a large array of high power lasers. In this embodiment, the efficiency and complexity of the fast laser energy delivery systems become the problem, particularly the ability to rapidly and repetitively pulse these lasers to achieve reasonable levels of power efficiency.

For magnetic systems, the threshold size of a steady state fusion reactor required to achieve ignition and offer a safe protective shielding will always be quite large. Unlike fission, where the first commercial reactor was 50 MW, a demonstration fusion reactor must start operation at multi-gigawatt powers.

BRIEF SUMMARY

There is a relatively unexplored region in reactor size and plasma energy density that lies between these two energy density extremes. The fusion plasmoid envisioned here results in a fusion reactor that falls into this unexplored size and energy density range. A plasmoid is a coherent structure of plasma and magnetic fields, an example of which is the plasmoid commonly referred to as the Field Reversed Configuration (FRC).

A quasi-steady fusion reactor based on plasmoids provides for a method to operate at an optimal power density. The methods and apparatus described herein provide a range of other desirable features as a source of neutrons including production of rare isotopes, diagnostic instruments and energy generation. For the generation of energy, many methods incorporate, but are not limited to, i) the generation of energy from fusion using a range of fuel (e.g., deuterium and lithium); ii) the conversion of Thorium to a fissile fuel; and iii) the transmutation of the radioactive waste to energy. These present many possible advantages. For example, the unique ability of the plasmoid to be translated over distances of several meters allows for the formation and kinetic energy input to be added incrementally outside of the interaction chamber and breeding blanket. This avoids the numerous challenges confronting other approaches where the sophisticated devices needed to create, heat, and sustain the plasma must be co-located along with the reactor blanket and power processing systems. Also for example, such may allow plasma exhaust (divertor) region to be well removed from the reactor, eliminating critical power loading issues. The entire high field reactor vacuum magnetic flux is external to plasmoid flux and is therefore divertor flux. In a transient burn, the particle loss from the plasmoid will be overwhelmingly directed to the divertor regions as the axial flow time is many orders of magnitude smaller than the perpendicular particle diffusion time in the open flux region. As another example of the possible advantages, by virtue of the cyclic nature of the burn, virtually all of the fuel can be introduced during the initial formation of the plasmoid with no need for refueling. As yet another example, the ability to locate the divertor remotely in an essentially neutron-free environment makes tasks such as fuel recovery and divertor maintenance much easier to perform. As still another possible advantage, both reactor and divertor wall loading may be easily regulated by the pulse duty cycle. As yet still another possible advantage, due to the linear, cylindrical reactor geometry there can be a high conversion efficiency of the fast fusion neutrons. As even still another possible advantage, the simply connected, linear geometry of the reactor vessel is amenable to a liquid metal wall interface. This would allow for operation at the highest power density, and solve several plasma-material wall issues.

The FRC has the highest $\beta$ (the ratio of plasma energy density to confining magnetic field energy density) of all fusion plasmas, and the simple cylindrical nature of the confining field coils allows for the highest magnetic fields. Thus, a further possible advantage, is that the small ratio of the plasmoid volume to the neutron absorbing blanket volume provides for an optimal power density to be obtained without exceeding thermal limitations in the blanket. A yet further possible advantage, is that the small footprint allows for easy integration into existing power plant infrastructure. An even further possible advantage, is that the smaller reactor scale also means much faster and far less expensive iterations during the development phase which will be essential to the integration of improvements and new technologies. A even still further possible advantage, is that with eventual fusion power output in the 50 to 200 MW range, these devices can be modularized.

Another unique possible advantage to a quasi-steady reactor is the possibility of direct energy conversion into electricity at high efficiency. The initially large volume, relatively cool plasmoid is accelerated to high velocity and then compressed into the fusion burn chamber much like fuel into an engine cylinder, however the compression ratio attained here is vastly greater (~400) resulting in near unity thermal efficiency. The fusion reaction greatly intensifies as peak compression is reached, and the fusion burn rapidly expands the plasmoid. This expansion is powered directly by the high energy ions magnetically trapped within the plasmoid, for example the alpha particles when tritium and deuterium are employed as fuels. With expansion driven by the fusion products, the magnetic energy is returned back into the circuit restoring the electrical energy expended in compressing the plasmoid initially. In this way energy can be directly converted to electricity avoiding the inefficient processes entailed in thermal conversion. The ability to make use of the plasma, fusion and electrical energy in a very efficient manner is unique to the concept described here, and enables the commercial application of fusion to be realized without resorting to larger scale, higher fusion gain systems. With the repetitive and efficient generation of plasmoids, brought to high temperature and density as they are injected into the interaction chamber, a compact, low-cost fusion reactor can be realized.

The unique geometry and simplicity of the device provides for other applications for the surplus neutrons that would normally be absorbed in the blanket. These neutrons can be employed in a transformational manner where their ability to produce rare isotopes, or initiate the process of the conversion of one element into another can be exploited. Alternatively other gases can be heated and compressed using the methods described to produce other products.

The methods and devices described herein allow the generation of high temperature plasma in a novel and unique manner that can operate in a power density that is distinct and advantageous compared to current devices, contains unique features that will speed and reduce the costs of development and minimize the energy required to heat the plasma.

The plasmoids that were generated employing at least one of the methods described herein, share several traits common to that of the FRC plasmoid. The FRC is a plasmoid with a symmetric toroidal geometry in which the confining magnetic field is provided primarily by toroidal plasma currents. The plasma pressure is contained by the encompassing magnetic pressure and magnetic tension with the result that the plasma energy dwarfs the FRC plasmoid magnetic field energy, and for this reason make the FRC the geometrically simplest, most compact, and highest β of all magnetic confinement concepts. Although the method of rapid magnetic field reversal is employed in forming the plasmoid considered here, it differs from past methods of FRC formation in that the field is reversed incrementally in stages imparting a rapid axial motion to the plasmoid during formation. It is quite possible that this method generates distinctly different internal plasma flows and currents, and therefore magnetic fields, from that of the symmetric, in situ formation of the FRC. The primary features of the plasmoid generated here appear to be similar to the FRC plasmoid in general. The use of the descriptor FRC is therefore used to indicate the method of plasmoid formation rather than any specific internal magnetic configuration and other plasmoids can be accelerated and compressed using the methods described herein.

The simply connected nature of the magnetic field of the FRC plasmoid with regard to the containment vessel and the linear confinement geometry, allow for the translation of the FRC plasmoid over large distances. These attributes make the FRC plasmoid especially attractive as a means to contain thermonuclear plasmas. These unique qualities, however, are realized at a cost. The topological simplicity makes the generation and sustainment of the large diamagnetic currents challenging. The configuration has net bad magnetic curvature and is susceptible to magnetohydrodynamic (MHD) interchange and kink modes. When isolated from the vessel wall by an external axial magnetic field, as is typically the case, the FRC plasmoid poloidal field represents essentially an anti-aligned dipole with regard to the external field and is therefore disposed to tilt instability.

Despite these daunting issues, stable high-temperature FRC plasmoids have been readily formed where the requisite plasma heating and current generation was produced by rapid reversal of the axial magnetic field in cylindrical coil geometry. Once formed, the FRC is observed to be stable and the plasma well confined as long as the plasma remains in a kinetic regime. This regime is characterized by S*, the ratio of the FRC separatrix radius, $r_s$, and the ion collisionless skin depth $c/\omega_{pi}$. Both stability and transport are observed to rapidly deteriorate when $S^*/\in >5$, where $\in$ is the FRC separatrix elongation $\in = I_s/2r_s$).

The FRC plasmoid decays on a resistive time scale that is anomalous. The observed particle confinement, stated in terms of directly measured quantities that can be accurately measured across all experiments, yields the following scaling:

$$\tau_N = 3.2 \times 10^{-15} \in^{0.5} x_s^{0.8} r_s^{2.1} n^{0.6} \quad \text{(Equation 1)}$$

where $x_s$ is the ratio of the FRC separatrix radius $r_s$, to coil radius $r_c$. With reasonable assumptions for the FRC relative size and shape ($\in \sim 15$ and $x_s = 0.6$), this scaling, together with kinetic condition, determine the plasma radius and density required to satisfy the Lawson criteria for fusion gain, i.e., $n \geq 1.5 \times 10^{23}$ m$^{-3}$ and $r_s \leq 0.07$ m. The high plasma energy density implied by these constraints prescribes a small, pulsed fusion regime for the FRC. However, these FRC plasmoid parameters have not been achieved by any methodologies previously employed in past experiments.

A method of heating plasmoids may be summarized as including increasing a kinetic energy of at least one of at least two plasmoids initially separated from one another by a distance, each of the plasmoids having a respective initial thermal energy; and at least temporarily confining an interaction of the plasmoids in an interaction chamber in a higher energy density state at a thermal energy greater than a sum of the initial thermal energies of the plasmoids. Increasing a kinetic energy of at least one of the plasmoids may include accelerating at least one of the plasmoids relatively towards at least one of the other ones of the plasmoids. Increasing a kinetic energy of at least one of the plasmoids may include magnetically accelerating each of the plasmoids relatively towards one of the other ones of the plasmoids over at least a portion of the distance.

Increasing a kinetic energy of at least one of the plasmoids may include accelerating at least one of the plasmoids relatively towards at least one of the other ones of the plasmoids, and may further include compressing at least one of the plasmoids while accelerating the at least one of the plasmoids.

The method may further include causing the two plasmoids to produce a resultant plasmoid in the interaction chamber to convert the kinetic energy of the at least one of the plasmoids into thermal energy.

The method may further include compressing at least one of the plasmoids with a magnetic field The method may further include forming the at least two plasmoids.

The method may further include forming each of at least two field reversed configuration (FRC) plasmoids outside of the reaction. Forming each of at least two field reversed configuration (FRC) plasmoids outside of the interaction chamber may include concurrently forming and accelerating at least one of the plasmoids. Forming each of at least two field reversed configuration (FRC) plasmoids outside of the interaction chamber may include concurrently forming, accelerating and compressing at least one of the plasmoids. Dynamically forming each of the two plasmoids by activating a series of magnetic coils in sequence may include forming an initial plasmoid by using a respective annular array of plasma sources for each of the two plasmoids and activating the series of magnetic coils in sequence. Forming each of the two plasmoids by activating a series of magnetic coils in sequence may include forming each of the two plasmoids by activating a respective series of independently-triggered magnetic coils in sequence.

The method may further include sequentially reversing a plurality of coils to dynamically form the plasmoids. Increasing a kinetic energy of at least one of the plasmoids may include activating a series of magnetic coils in sequence to accelerate each of the plasmoids, the thermal energy of the resultant plasmoid including components of the conversion of a respective kinetic energy from the acceleration of each of the plasmoids. Increasing a kinetic energy of at least one of the plasmoids may include simultaneously compressing and accelerating each of the plasmoids by activating a series of magnetic coils in sequence. Simultaneously compressing and accelerating each of the plasmoids by activating the series of magnetic coils in sequence may include each of the magnetic coils having a smaller radius than a preceding one of the magnetic coils in the series.

The method may further include heating and compressing the plasmoids by self compression into a radially converging magnetic field.

The method may further include collecting at least one of heat, tritium, helium 3, fissile fuel, medical isotopes or other products resulting from interaction of neutrons produced by reaction of the plasmoids with a blanket of material at least proximate the interaction chamber.

An apparatus for heating plasmoids may be summarized as including a interaction chamber having a generally cylindrical shape with a first end and a second end, the interaction section; a first acceleration section that provides a first plasmoid coupling path to the interaction chamber; a second acceleration section that provides a second plasmoid coupling path to the interaction chamber; a first plurality of magnetic coils successively arranged along a least a portion of a length of the first acceleration section, the first plurality of magnetic coils configured to accelerate a first initial plasmid toward the interaction chamber with increasing kinetic energy; and a second plurality of magnetic coils successively arranged along a least a portion of a length of the second acceleration section, the second plurality of magnetic coils configured to accelerate a second initial plasmid toward the interaction chamber with increasing kinetic energy.

The apparatus may further include a third plurality of magnetic coils successively arranged along at least a portion of an interaction chamber and surrounding an outer perimeter of interaction chamber configured to at least temporarily confine a resultant plasmoid in the interaction section.

The apparatus may further include a first formation section to temporarily retain the first initial plasmoid, the first acceleration section located between the first formation section and the interaction chamber, the first plasmoid coupling path being linear; and a second formation section to temporarily retain the second initial plasmoid, the second formation section located between the second formation section and the interaction chamber, the second plasmoid coupling path being linear.

The apparatus may further include a first plasma source configured to form a first initial plasmoid in the first formation section; and a second plasma source configured to form a second initial plasmoid in the second formation section.

The apparatus may further include a first annular array of plasma sources to produce the first initial plasmoid in the first formation section; and a second annular array of plasma sources to produce the second initial plasmoid in the second formation section.

The apparatus may further include a fourth plurality of magnetic coils successively arranged along at least a portion of the first formation section and surrounding an outer perimeter of the first formation section; and a fifth plurality of magnetic coils successively arranged along at least a portion of the second formation section and surrounding an outer perimeter of the second formation section. Each of the first and the second pluralities of magnetic coils may surround an outer perimeter of the first and the second acceleration sections respectively and may include a series of magnetic coils configured to be activated in sequence to accelerate the first and the second initial plasmoids, respectively.

The apparatus may further include a blanket at least partially surrounding providing the interaction chamber; a quantity of lithium at least temporarily contained proximate the interaction chamber by the blanket; and an extraction system to extract tritium resulting from interaction of neutrons produced by interaction of the plasmas with the lithium proximate the interaction chamber.

The apparatus may further include a blanket at least partially surrounding providing the interaction chamber; a quantity of lithium at least temporarily contained proximate the interaction chamber by the blanket; and an extraction system to extract heat resulting from interaction of neutrons produced by reaction of the plasmas with the lithium.

A method of direct energy conversion of any or all parts of the input energy or product fusion energy may be summarized as including successively supplying electrical energy to a first series of magnets along at least a first acceleration section to accelerate a first plasmoid toward an interaction section of a interaction chamber; successively supplying electrical energy to a second series of magnets along at least a second acceleration section to accelerate a second plasmoid toward the interaction chamber; and recovering electrical energy from at least some of at least one of the first or the second series of magnets after the first and the second plasmoids begin interacting in the interaction chamber. Recovering electrical energy from at least some of the magnets may include recovering electrical energy from at least one of the magnets of both the first and the second series of magnets.

The method of fusion generation may further include recovering thermal energy from a blanket of a material at least proximate the interaction chamber generated by the interaction of the first and the second plasmoids in the interaction chamber.

The method of fusion generation may further include recovering a fuel from a blanket including a quantity of lithium at least proximate the interaction chamber generated by the interaction of the first and the second plasmoids in the interaction chamber.

A fusion generation system may be summarized as including a interaction chamber in which at least two plasmoids may interact a first acceleration section that leads to the interaction chamber; a first series of magnets spaced longitudinally along at least a portion of the first acceleration section to accelerate a first plasmoid toward the interaction chamber; at least one circuit operable to successively supply electrical power to the magnets of at least the first series of magnets to accelerate at least a first one of the plasmoids toward the interaction chamber and to recover electrical energy from the magnetic circuits.

The fusion generation system may further include a second acceleration section that leads to the interaction chamber; a second series of magnets spaced longitudinally along at least a portion of the second acceleration section to accelerate a second plasmoid toward the interaction chamber. The at least one circuit may be operable to successively supply electrical power to the magnets of at least the second series of magnets to accelerate at least a second one of the plasmoids toward the interaction chamber and to recover electrical energy from at least some of the magnets of at least the second series of magnets after the plasmoids interact in the interaction chamber.

The fusion generation system may further include a thermal extraction subsystem thermally coupled to the blanket and operable to recover thermal energy produced by the interaction of the plasmoids in the interaction chamber. The thermal extraction subsystem may include a steam powered electrical generator or other heat engine.

A method of plasmoids may be summarized as including forming at least a first plasmoid in a formation section; and accelerating at least the first plasmoid concurrently with forming the first plasmoid.

The method may further include compressing at least the first plasmoid concurrently with forming and accelerating the first plasmoid.

The method may further include sequentially reversing a plurality of coils to dynamically form at least the first plasmoid. Accelerating at least the first plasmoid may include accelerating at least the first plasmoids relatively towards at least one other plasmoid. Accelerating at least the first plasmoid may include magnetically accelerating at least the first plasmoids relatively towards at least one other plasmoid over at least a portion of a distance. Compressing at least the first plasmoid concurrently with forming and accelerating the first plasmoid may include compressing at least one of the plasmoids with a magnetic field.

The plasmoid based fusion reactor includes a interaction chamber, a plurality of magnetic coils, and two sets of annular arrays of plasma sources. The interaction chamber has a generally cylindrical shape with a first end and a second end. The interaction chamber includes an interaction section in the middle of the interaction chamber. Two formation sections are positioned at respective ends of the interaction chamber. Two acceleration sections are positioned between respective formation and interaction sections. Each series of magnetic coils surround an outer perimeter of a respective section. Each set of the annular array of plasma sources is located at a respective end of the formation chamber and configured to form an initial plasmoid. Each of the series of magnetic coils surrounding the outer perimeter of the formation sections and the acceleration sections includes a series of independently-triggered magnetic coils configured to be activated in sequence to accelerate a plasmoid.

The plasmoid may be a plasma magnetically confined within a magnetic 'bottle' and generated by currents that flow in the plasma itself, rather than in external coils. The equilibrium size and shape of the plasmoid may, for example, be approximately equivalent to that of an elongated football. The reactor may have scale consistent with the size and energy density required for fusion.

The reactor may advantageously employ a simple linear geometry. The reactor may advantageously realize a high plasma-to-magnetic energy ratio and closed-field confinement. Each of these advantages contributes to low reactor cost. Another advantage is the capability to move the plasmoid over relatively large distances. Yet another possible advantage of the approach is avoidance of the complications that plague other more conventional approaches, which include sophisticated devices to create, heat, and sustain the plasma and must be co-located with a reactor blanket and power processing systems.

The plasmoids may be accelerated to high velocity and injected into a fusion interaction chamber much like fuel into an engine cylinder. The confining magnetic field continues to compress the plasmoids toward fusion conditions, intensifying the fusion reaction as peak compression is reached. In a method analogous to the operation of a conventional diesel engine, the fusion "burn" rapidly expands the plasmoid. Plasmoid expansion is powered directly by the high energy alpha particle that is created along with the neutron in the fusion reaction. In a further embodiment, the alpha particle is magnetically trapped in the resultant plasmoid. With alpha particle-driven expansion, magnetic energy is returned back to an original source circuit, thereby restoring the electrical energy initially expended in compressing the plasmoids. In this way a self-perpetuating compression cycle that forms a fusion engine (FE) is established.

One advantage of these embodiments is that fusion, plasma and electrical energy are all used efficiently. In yet another embodiment, these advantages are used in a commercial application to provide power at a low cost. Using certain fusion reactions, for example between deuterium and tritium, the fusion reaction produces neutrons that can interact with lithium containing materials in a blanket surrounding a interaction chamber such that the energetic neutrons are absorbed by the lithium and converted into tritium fuel and heat. The heat may be advantageously used to generate electricity, either in a way conventional to a power plant operating on a steam cycle, or in alternative ways. One advantage of this embodiment is that the device produces heat for conventional power generation and at the same time produces more tritium fuel than it consumes.

BRIEF DESCRIPTION OF THE SEVERAL
VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the figures are expanded in the vertical (radial) scale for clearness.

FIG. 4 is a diagram depicting a two-dimensional MHD numerical calculation of the magnetic configuration at the end of formation and the continuation of the acceleration of the FRC plasmoids according to one non-limiting embodiment.

FIG. 5 is a diagram depicting a two-dimensional MHD numerical calculation of the magnetic configuration during the acceleration and compression of the FRC plasmoids according to one non-limiting embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the field reversed configuration have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings and Abstract of the Disclosure provided herein are for convenience only and do not interpret the scope or meaning of the embodiments.

As a proof-of-principle experiment (demonstration) of the plasmoid heating apparatus, an embodiment referred to as the prototype experimental device (PED) is constructed and demonstrated. The PED comprises two magnetically driven coil systems for the formation, acceleration, and compression of a field reversed configuration (FRC) plasmoid to high velocity with respect to the other (up to 800 km/s). The motional energy of the accelerated FRC plasmoid provides a significant fraction of the energy needed to heat the plasma to fusion temperatures, as well as provides a means to further compress the plasmoid into higher magnetic fields and smaller chambers. The motional energy becomes rapidly converted to thermal energy when the two FRC plasmoids merge. In the experiment, the FRC plasmoids are observed to interact/merge with one another, forming a resultant, hot (5 million ° K) plasmoid that is further compressed and heated (up to 20 million ° K) by an axial magnetic field.

Figure 1:
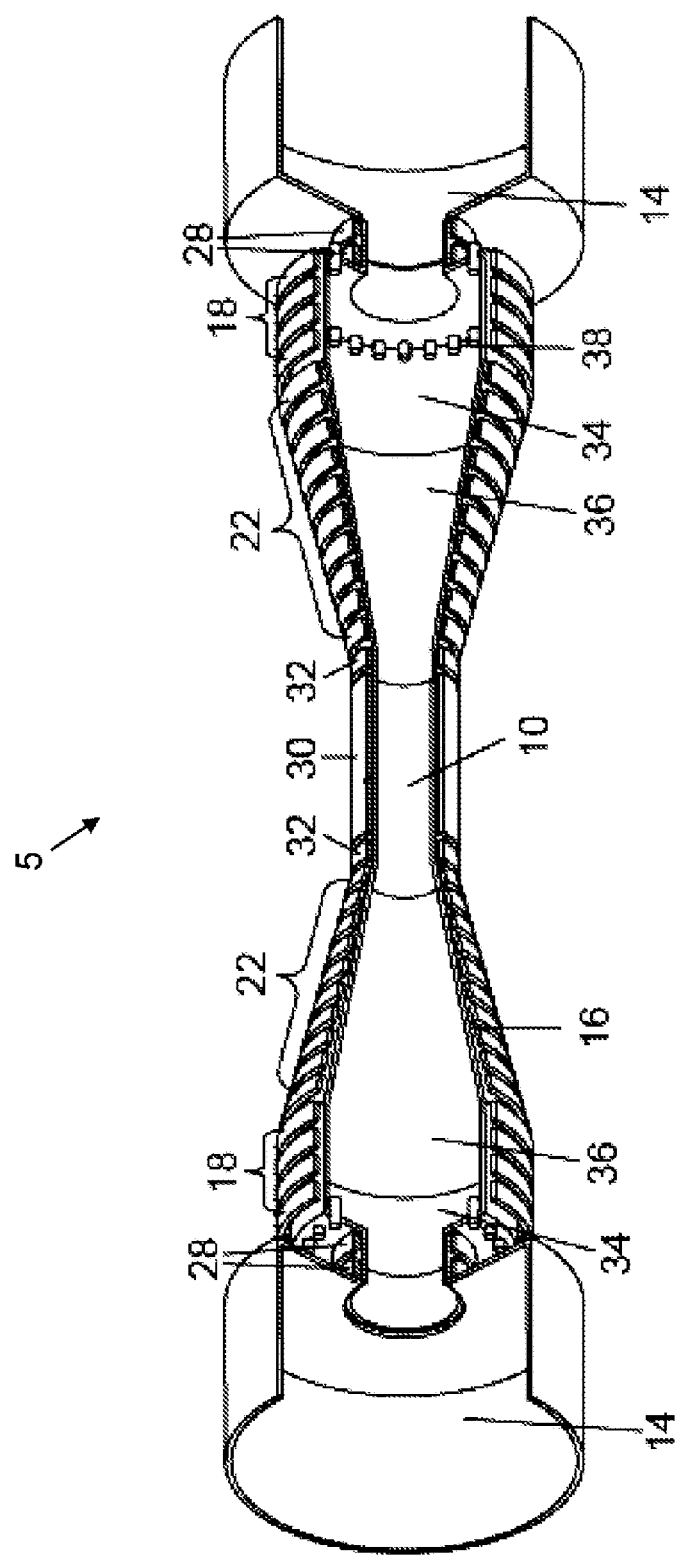
FIG. 1 is a simplified diagram of a three-dimensional cross-sectional view of a fusion reactor according to one non-limiting embodiment.
Figure 2:
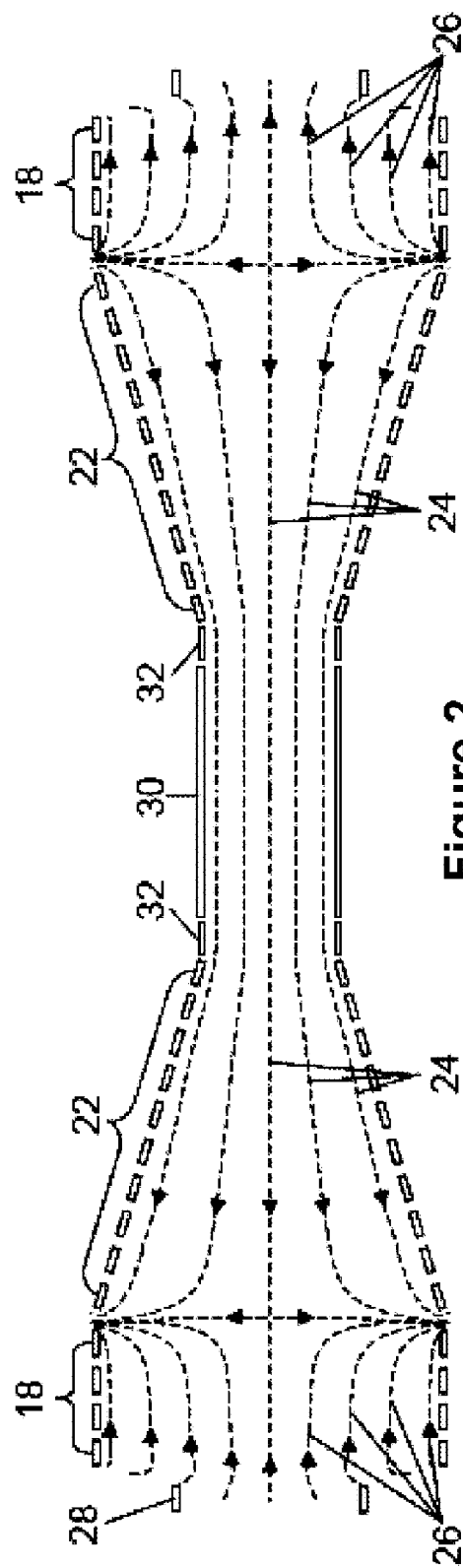
FIG. 2 is a diagram depicting a two-dimensional Magnetohydrodynamic (MHD) numerical calculation of the magnetic configuration at the initiation of FRC plasmoid formation according to one non-limiting embodiment.

FIG. 1 illustrates a fusion reactor 5 according to one non-limiting embodiment. In one embodiment, the fusion reactor 5 may include an interaction chamber 10 in the center, a formation, accelerator and compression section 36 on each end of the interaction chamber 10, and a FRC plasmoid formation section 34 next to each accelerator/compression section 36. The fusion reactor 5 may additionally include a divertor 14 on the outer end of each formation section 34. The fusion reactor 5 may also include interaction chamber coils 30, 32 around the outer perimeter of the interaction chamber 10, accelerator coils 22 around the outer perimeter of the acceleration/compression section 36, formation coils 18 around the outer perimeter of the formation section 34, and end coils 28 around the outer perimeter of the fusion reactor 5 between the extreme end of each formation section 34 and the respective divertor 14. The fusion reactor 5 may further include an annular array of small plasmoid sources 38 located near a dielectric vacuum tube wall under the first formation/acceleration coil 18 nearest the end coils 28. The chamber wall 16 of the fusion reactor 5 may act as a vacuum boundary.

FIGS. 2 through 7 depict cross sections taken in a plane passing through the axis of symmetry of the fusion reactor 5 to show the magnetic configuration. Only the magnetic coils of the fusion reactor 5 are shown for clarity. The dashed lines delineate magnetic field contours, and the arrows indicate the polarity of the magnetic field. The sequence of FIGS. 2 through 7 illustrates the temporal changes in magnetic field structure. In particular, the sequence from FIG. 2 through FIG. 7 illustrates the magnetic field contours at various key times in the operation of the FRC fusion reactor 5.

The field contours reflect results from a resistive, two-dimensional MHD numerical calculation. The changes in the magnetic field contours shown in FIGS. 2 through 7 were produced by energizing the axial array of coils in a properly sequenced manner. The magnetic waveforms for the coils 18, 22, and 28 are preferably produced with a rise time and magnitude that maintains the maximum axial field gradient across the FRC plasmoid consistent with maintaining FRC plasmoid stability and isolation from the vacuum boundary 16. The number of coils employed, as well as the field magnitude and timing used in this process is determined by the desire to maintain, in the frame of the FRC plasmoid, a quasi-stationary magnetic geometry that increases in magnitude and decreases in scale as the FRC plasmoid moves through the acceleration/compression section 36 into the interaction chamber 10.

To minimize the FRC plasmoid formation time, as well as maximize acceleration, the PED device is constructed so that a new formation methodology could be employed, which is referred to as dynamic formation, and is described in greater detail below. In virtually all previous FRC experiments a monolithic field reversed theta pinch (FRTP) coil was employed. W dynamic formation the FRTP is replaced with a set of electrically isolated and independently triggered formation coils 18. In one embodiment, all the formation coils 18 are supplied with an initial reverse bias field 26 indicated by arrows pointing to the left (see FIG. 2). A forward bias (arrows to the right) is applied to the end coils 28 and the accelerator coils 22, as well as the interaction chamber coils 30 and 32. In one embodiment, the FRC plasmoid formation section 34 is increased in radius to provide for greater initial FRC plasmoid flux and energy. This is followed at smaller radius by a set of accelerator/compression coils 22 with forward bias increasing as the radius decreases moving towards the interaction chamber 10. In one embodiment, a gradual reduction in radius and increase in compression result as an FRC plasmoid travels down the acceleration/compression section 36. In one embodiment, the interaction chamber 10 is matched to the smaller radius of the acceleration/compression section 36. Alternatively, a smaller or larger interaction/compression chamber may be employed depending on the manner in which the fusion burn process is to be sustained, as well as the optimum blanket geometry for neutron irradiation.

Figure 3:
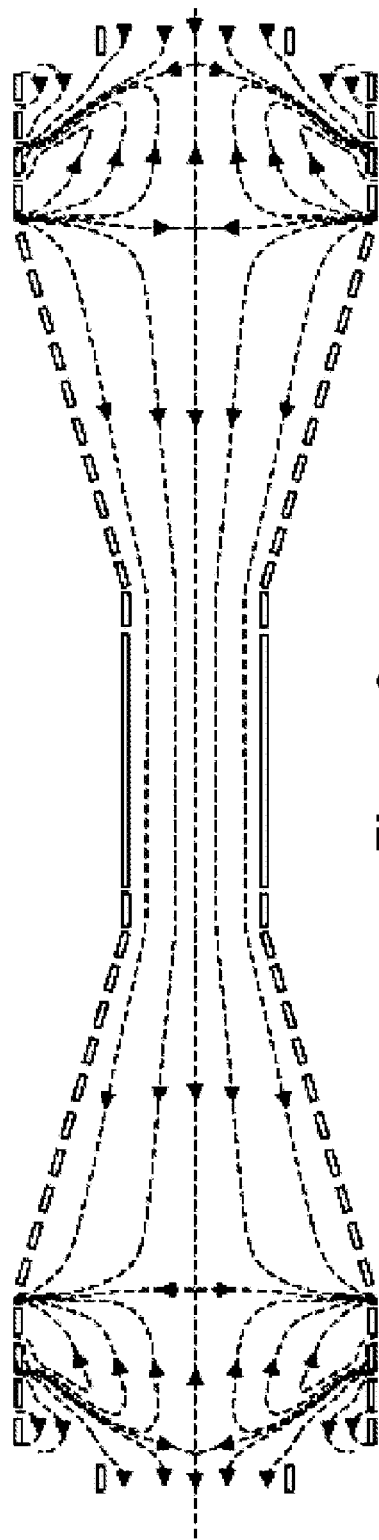
FIG. 3 is a diagram depicting a two-dimensional MHD numerical calculation of the magnetic configuration during dynamic formation of the FRC plasmoids according to one non-limiting embodiment.

In the experiments, the formation coils 18 are energized sequentially to both form, accelerate, and compress the FRC plasmoids simultaneously. The process is illustrated in FIG. 3 where magnetic field contours reflect the magnetic configuration at the midpoint of the FRC plasmoid formation in time. By executing field reversal in this sequenced fashion the FRC plasmoid internal flux 72 can be maintained throughout the entire process. The FRC plasmoid formation is completed with field line closure as depicted in FIG. 4. At this point the FRC plasmoid 20 is now magnetically isolated from the vacuum wall 16. The FRC plasmoid 20 continues to be accelerated by the gradient magnetic field produced by the sequenced formation coils 18 now acting as accelerator coils In one embodiment, the initial, low energy plasma is generated by the annular array of small plasma sources 38. The plurality of these sources is dictated by the need to achieve an azimuthally uniform initial plasma. The annular plasma formed by these sources must be free of azimuthal non-uniformities in order to not seed instability as the plasma is radially compressed during FRC plasmoid formation. The plasma at this time is susceptible to flute-like instabilities. These modes are stabilized by finite ion gyro-orbit effects once the ions are heated with the completion of FRC plasmoid formation (see FIG. 4). The radial proximity of the plasma near the wall assures good flux retention through field reversal. The pulse length and magnitude of the plasma flow are important in that these parameters determine the inventory and initial length of the FRC plasmoid. The use of plasma sources in this manner also provides for a means to keep the interaction chamber 10 and the acceleration/compression sections 36 at high vacuum. This is important as a significant neutral density dramatically affects FRC plasmoid behavior during acceleration and compression. In demonstration experiments, a significant neutral gas density prevented both FRC plasmoid merging and equilibrium.

As important as obtaining the proper density and temperature of the plasmoid for fusion, is the amount of internal poloidal flux of the FRC plasmoid as the FRC plasmoid lifetime scales directly with this quantity. A characteristic of all past FRC experiments formed in a FRTP is that there are two distinct phases of FRC formation where this flux is lost. The first is the flux that is lost in the reversal process itself. This flux loss is characterized by the fraction of the initial reverse bias flux that still remains after the external axial field as been reversed to a level where the radial magnetic pressure exceeds the pressure of the bias flux and plasma, and the plasma has moved radially away from the vacuum wall. The remaining flux is referred to as the "lift-off" flux. As the field is reversed, a conductive plasma sheath is formed at the vacuum tube wall that inhibits further loss of reverse flux. The sheath however is resistive enough that a significant fraction of the reverse flux is lost. The second period of flux loss occurs as this plasma sheath moves radially inward with the rise of the forward field. To reach equilibrium the plasma must broaden onto the outer forward field. The flux loss at this time is due to the turbulent transport that occurs during relaxation of the FRC plasmoid into equilibrium.

A new formation technique is realized that maximizes lift-off flux and minimizes subsequent flux loss. It also provides for a method to simultaneously accelerate, rapidly translate and compress the FRC plasmoid into a much smaller, higher field coil without diminishing the plasmoid axial motion. The entire process is referred to as dynamic formation. Dynamic formation describes the complete, continuous process employed to form, accelerate and compress the FRC plasmoid into the compression chamber where it is merged with its mirror image to form the ultimate plasmoid to be compressed to thermonuclear conditions. The dynamic formation method was incorporated into the design and construction of the PED in FIG. 8 as well as the device depicted in FIGS. 2 thru 7. A more detailed description of dynamic formation and its advantages follows.

Standard FRTP formation employs a long cylindrical pinch coil that is reversed with the simultaneous formation of a reversed field throughout the entire coil. The FRC is generated by the following sequence of events: (1) A weakly ionized gas is produced in an axial magnetic field. This field is usually referred to as the bias field. (2) Voltage is applied to the coil reversing the direction of the axial magnetic field. The induced azimuthal electric field generates a strong ionizing current that prohibits the loss of the initial axial field now referred to as the trapped reversed field. (3) Increasing (forward) axial field now provides for the formation of the FRC. Forward flux equal to the trapped reversed flux forms closed field lines inside the vacuum chamber. Plasma can now flow on these field lines from the inner (reversed) field to the outer field and relax to form a proper radial and axial equilibrium distribution. (4) Increasing the magnetic field further radially compresses and heats the FRC. This additional field is now external to the FRC insulating it from the vacuum boundary. The closed field line FRC contracts axially into a high $\beta$ equilibrium to balance the compressional effect of the external axial field. In this manner a magnetically isolated plasmoid is formed that is neutrally stable to translation if the external guide field is uniform. The entire time from the lift-off of the plasma sheath to the relaxation into equilibrium is characterized by anomalous flux and energy loss.

If translation of the FRC is also desired, even more time is lost while the FRC is subsequently accelerated. After being formed, the FRC can be caused to translate out of the FRTP coil by either activating a separate trigger coil that was not employed for formation, or by having constructed the FRTP coil with a slight radial taper where the small axial field gradient eventually causes the FRC to drift to the end of the coil where it feels the strong magnetic gradient at the end of the coil and is ejected.

This method for producing the FRC and its directed motion is undesirable for several reasons. First, it takes considerable time for the FRC to relax to an equilibrium all the while losing both inventory (mass) and flux. Second, it provides essentially for only the thermal energy of the FRC to be converted into directed energy. The expanding radius of the conical coil also reduces the magnetic field B, and plasmoid azimuthal current J, and therefore significantly diminishes the accelerating J×B body force acting on the FRC as it translates out of the coil. These are serious drawbacks that would limit the efficiency of the FRC acceleration, compression and heating.

All of these disadvantages are avoided in the dynamic formation method. The sequential excitation of the formation coils provides for several advancements over the traditional triggered field reversed theta pinch or conical pinch. Specifically: (1) sequential excitation creates a very strong axial gradient in the axial magnetic field which produces a powerful axial body force with the initiation of every coil. (2) The FRC plasmoid formation occurs simultaneously with acceleration providing for the most rapid FRC plasmoid formation and translation possible. (3) The FRC plasmoid flux is preserved during the entire formation/acceleration process, as the reverse bias flux is undiminished until the last coil is reversed. In the traditional FRTP method flux loss occurs simultaneously all along the coil so that the "clock" on internal flux loss begins once the reversal is initiated. In the sequential method this reversal is reenacted with each coil excitation and reversal flux is maintained at the initial value up to last coil to be reversed. This process can be carried out all the way up to insertion of the FRC plasmoid into the compression chamber if desired, and was demonstrated on the PED although it was not found to be the optimal method. A coil is designated as a formation coil if it initiated with a reverse bias field. It is designated an accelerator coil if it has a forward bias field initially. Employing this nomenclature, only the first four coils are operated as formation coils for the device operation depicted in FIGS. 2 thru 7. The prototype experimental device was operated with as few as four and as many as eight formation coils. The employment of four or five formation coils was found to be optimum. (4) The coil prior to the coil about to be energized naturally injects some plasma forward inside the next coil near the vacuum wall as it is activated. This process provides for a more rapid sheath formation under the next reversing coil. This minimizes flux loss during reversal and maximizes the amount of internal flux that can be realized. (5) With no need for a conical coil, combined with the maximum possible internal flux, the largest axial and radial Lorentz (J×B) force acting on the FRC is achieved. It is therefore possible to perform magnetic compression into smaller coils at the same time the FRC is being accelerated or translated.

Great advantage of this last point is taken in the design and operation of the device as described by FIGS. 1 through 7. The FRC plasmoid velocity is maintained or even increased while it is simultaneously being compressed into smaller and smaller coils at higher field. Dynamic formation therefore provides for the staged compression of the FRC plasmoid all the way into the reactor compression chamber. It is made possible by the proper sequencing of the axial array of short cylindrical coils while employing the correct magnetic field rise time and strength to first form the FRC plasmoid, and then to maintain the FRC plasmoid in a quasi-equilibrium during the remainder of the process.

The desired final goal with dynamic formation is the insertion of a well formed plasmoid at high velocity, density and temperature into the compression chamber where it is merged with an identical plasmoid moving in the opposite direction. Once merged the dynamic formation phase of the FRC plasmoid ends and the final compression phase begins. The ability to operate with a coil system that can perform the proper dynamic formation is critical in obtaining this goal. The proper sequencing is illustrated in FIGS. 3 thru 7.

Figure 6:
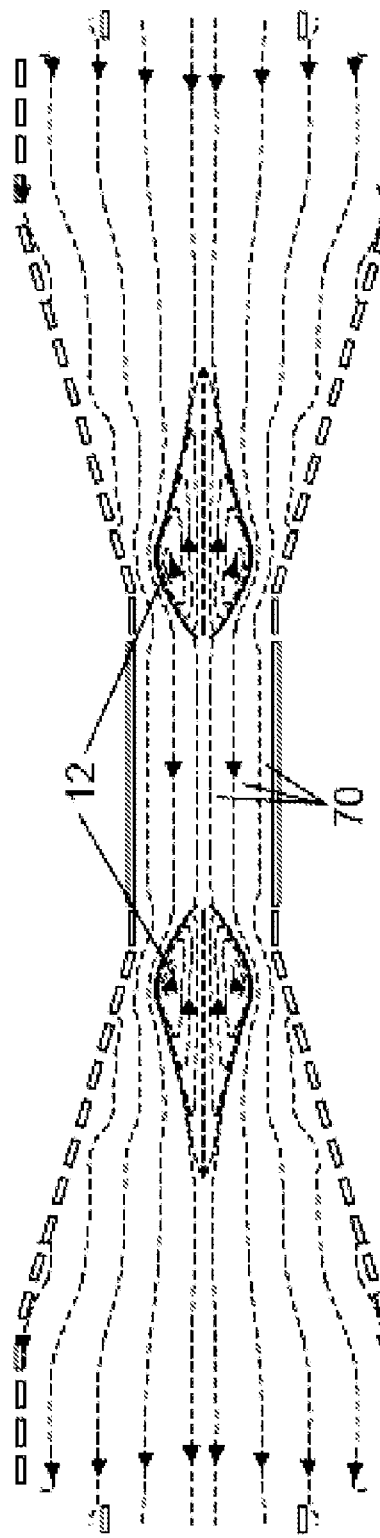
FIG. 6 is a diagram depicting a two-dimensional MHD numerical calculation of the magnetic configuration during active compression and the start of self compression of the FRC plasmoids according to one non-limiting embodiment.
Figure 7:
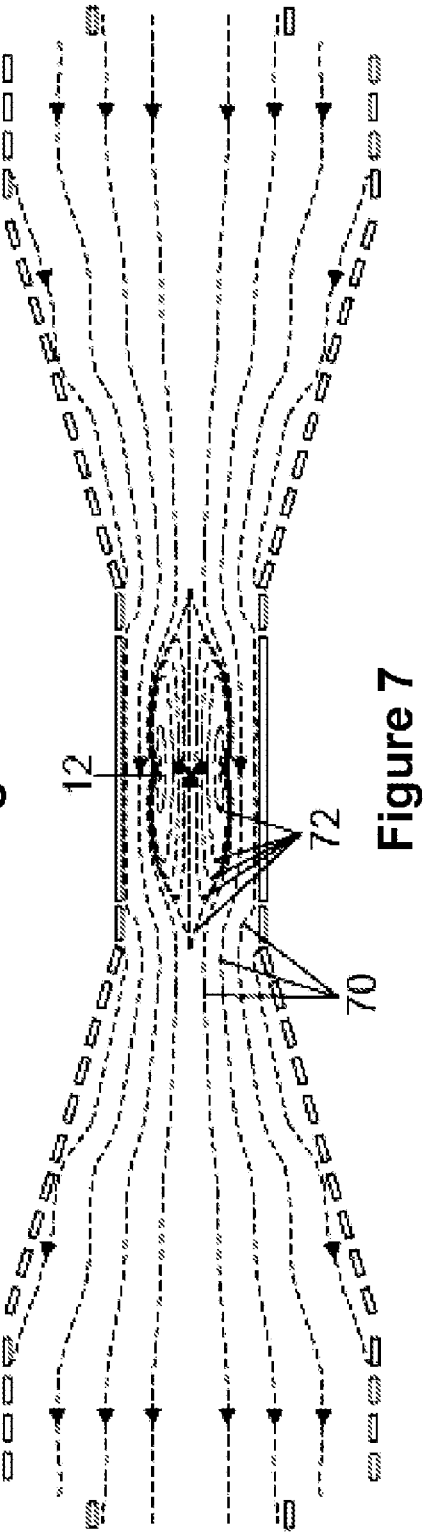
FIG. 7 is a diagram depicting two-dimensional MHD numerical calculation of the magnetic configuration after collision and stagnation of the two according to one non-limiting embodiment.

After the FRC plasmoid 20 is formed and injected into the acceleration/compression sections 36 (see FIG. 5), the FRC plasmoid 20 is further accelerated by sequentially energizing the accelerator coils 22, producing a magnetic field of increasing strength as the radius is reduced. The FRC plasmoid 20 is compressed into an ever increasing magnetic field until it reaches its terminal velocity (see FIG. 6). At this point the FRC plasmoid penetrates the high magnetic field 70 generated by the interaction chamber coils 30 and 32 due to the large axial momentum attained through the acceleration and compression process prior to this point. This manner of FRC plasmoid compression is referred to as self compression as it occurs without application of any external forces, for example, the energizing of any external coils. The compression into the higher magnetic field region is manifested by a momentum reduction of the FRC plasmoid. The FRC plasmoid 20 as shown in FIG. 6 preferably still has a significant axial velocity after it enters the interaction chamber 10 to overcome the axial magnetic forces of the interaction chamber field that tend to eject the FRC plasmoid until it is fully within the chamber coils 30 and 32. This remnant velocity is rapidly converted into ion thermal energy on collision with the oppositely directed FRC plasmoid 20 (see FIG. 7). The collision and stagnation of the two FRC plasmoids is all that is needed to provide for this energy conversion. The merging of the two FRC plasmoids into a resultant FRC plasmoid as depicted in FIG. 7 is not critical, but is believed to occur in all the experiments that were performed on the PED. The rapid increase in FRC plasmoid thermal energy from this conversion is accompanied by a rapid increase in FRC plasmoid length. This expansion can be redirected into a radial expansion by employing a separate magnetic coil 32 to create a magnetic field at the end of the main interaction chamber coils 30 that is at least as large as the field external to the FRC plasmoid at the midplane. A larger-radius FRC plasmoid confined by a mirror field is preferable, as the confinement is observed to be several times better than the scaling predicted by equation (1) above.

Figure 8:
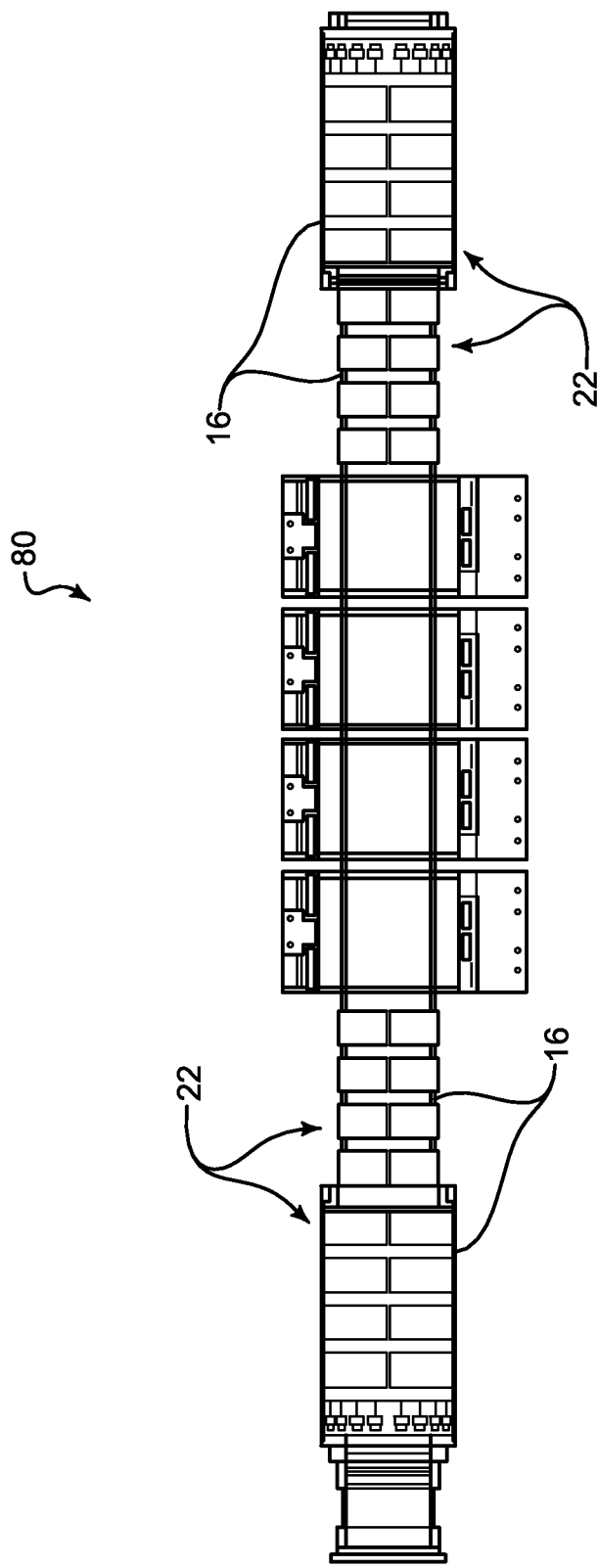
FIG. 8 is a schematic diagram depicting the prototype experimental device according to one non-limiting embodiment.

To demonstrate the conceived embodiment, a prototype experimental device 80 was constructed, shown schematically in FIG. 8. The PED 80 is similar in design to the embodiment of the FRC fusion reactor 5 illustrated in FIG. 1, differing primarily in that the accelerator coils 22 and chamber wall 16 are reduced in radius in a stepwise fashion rather than as a continuous taper. The manner of reduction is not critical, but is preferably made as gradual as possible to avoid inducing plasma turbulence as the FRC plasmoid is accelerated and compressed.

In the embodiment the device described in FIG. 8 two oppositely directed FRC plasmoids each having a mass of 0.1-0.2 mg at velocities ranging from 200 to 300 km/s are merged. It is constructed in manner such that the resultant plasmoid may be compressed by an axial magnetic field to thermonuclear temperatures. The device is 3 meters in length and consists of two, 1 meter long FRC plasmoid formation, acceleration, pre-compression regions, referred to as Dynamic Formation Sections (DFS), which are positioned axially at each end and a one meter central compression section. The vacuum boundary for the device consists of two 28 cm diameter clear quartz cylindrical tube sections, roughly 50 cm in length that are mated to each end of a smaller 20 cm diameter, 2 meter long quartz cylinder that also serves as the vacuum boundary inside the compression section. This smaller cylinder extends equally out each end of the compression section roughly 50 cm to form part of the DFS vacuum boundary. Vacuum forces are supported through the two 6-way crosses at each end of the device. These crosses also contain a turbo-molecular vacuum pump, vacuum measurement devices, and observation windows for fast framing cameras and other spectroscopic equipment.

The central compression section consists of four identical 3-turn magnets that are energized by capacitor energy storage modules with sufficient energy to produce a central compression magnetic field of 1.2 T. The two outer coils and two inner coils of the compression bank are each powered by ten and five 14.6 µF capacitors respectively, and all are charged to a voltage of 15 kV. The end coils, having significantly more energy, form a mirror magnetic field axially with a mirror ratio of roughly 1.25. The rise time of the central compression bank magnetic field is roughly 18 µs. The compression field coils are energized one to two microseconds prior to the arrival of the two FRC plasmoids. After the peak field is reached, the magnetic field is sustained by activating a "crowbar" switch that routed the magnet current so as to circulate the current only through the compression coil. The use of the crowbar on this device allows for more detailed measurements of the plasma confinement as well as fusion neutron production. For energy recovery this current would normally be allowed to flow back into the capacitor to recover both the magnetic and plasma energy not lost during compression.

The second method for preionization is the application of an azimuthal array of coaxial plasma discharge sources located radially at the periphery of the quartz wall, and axially at the upstream end of each DFS as shown in FIG. 8. Deuterium gas is introduced via an array of matched fast puff valves mounted to the breach end of the coaxial plasma sources. The timing of the gas puff is made to provide for breakdown and ionization of the neutral gas during the rise of the reverse bias field with negligible neutral gas inside either DFS or compression chamber. Each plasma source is inductively isolated from the others, and each array is energized with a common 54 µF capacitor charged up to 7 kV, which results in a discharge current of up to 10 kA through each plasma source for a duration of 20 to 30 µs. The array of plasma discharges ionize essentially all of the neutral gas introduced to form the FRC plasmoids. The magnitude and flow speed of the ionized deuterium out of the plasma sources is adjusted to provide the desired plasma density under the formation coils at the desired time for initiating the FRC plasmoid formation sequence.

Both dynamic formation sections consist of an end bias coil, and eight independently triggered formation/acceleration/pre-compression coils with a spacing of 10 cm. The employment of these coils in a sequential manner, with the appropriate magnetic field coil rise time and timing comprise what is referred to as dynamic formation (to be described in detail below). Typically the first four coils are initialized with a reverse bias field of 0.06 to 0.08 T. A forward bias is applied to the end bias coils, the remaining dynamic formation coils, as well as the four coils of the compression section. In this way two magnetic cusp fields are introduced axially within the dynamic formation section. The plasmoid separatrix is thus established inside the vacuum prior to field reversal.

Each formation and acceleration coil is constructed of a band of copper wrapped around the quartz tube and insulated with shrink tubing and polyethylene sheet. Each single turn coil is 7.5 cm wide and spaced at 10 cm intervals along the axial length of each DFS. Each coil is connected to the energy storage capacitors and switches with sixteen parallel runs of high voltage coaxial cable. This results in a power delivery system that is well coupled with minimal stray inductance. These coils are energized sequentially (magnetic field rise time=1.6 µs) over an interval roughly 5 µs for forming, accelerating and compressing the FRC plasmoid. The magnetic field swing produced in each coil is 0.8 T at a charging voltage of 30 kV. The coil to coil coupling is found to be 25% in vacuum and less with a plasmoid present. For optimal dynamic formation a typical timing delay from coil to coil is 0.4 µs for the formation coils, and somewhat less for the acceleration coils. Each coil is independently energized, initiated by a single, high voltage, high current thyratron switch. The thyratron is of a special manufacture often referred to as a pseudo-spark switch. The switch can be reliably operated at DC holding voltages 35 kV, delivering a maximum current of 100 kA with a jitter of 30 ns or less, which more than meets the timing and power transfer requirements for proper sequencing of the coils during the discharge.

Precise control of the apparatus is accomplished by using computer controlled timing and data acquisition equipment. Initial design parameters (physical dimensions, plasma parameters, applied magnetic field, timing sequence, etc.) are determined by employing a two dimensional (r and z in cylindrical coordinates), resistive, magnetohydrodynamic (MHD) computer code. The MHD code is initialized with the appropriate initial experimental conditions: device radius, length and coil spacing, plasma density, temperature, and spatial distribution. Calculations are performed where coil voltages, magnetic waveforms, and in particular, the timing of all coils are varied in order to arrive at the optimum dynamic formation sequence. Based on these numerical calculations, hardware (including but not limited to: capacitors, coils, high current switches, and fast gas puff valves are specified, designed and/or purchased to provide for operation of the apparatus in a manner similar to that employed in the MHD code calculations. The electrical circuit design is based on obtaining the desired current waveforms. This effort was aided with circuit design software such as SPICE, which is used to model the coupling and performance of the various high-voltage coils used to generate the magnetic fields. After the individual hardware components are built, they are tested and modified until the hardware performance closely matches the required design parameters.

Figure 10:
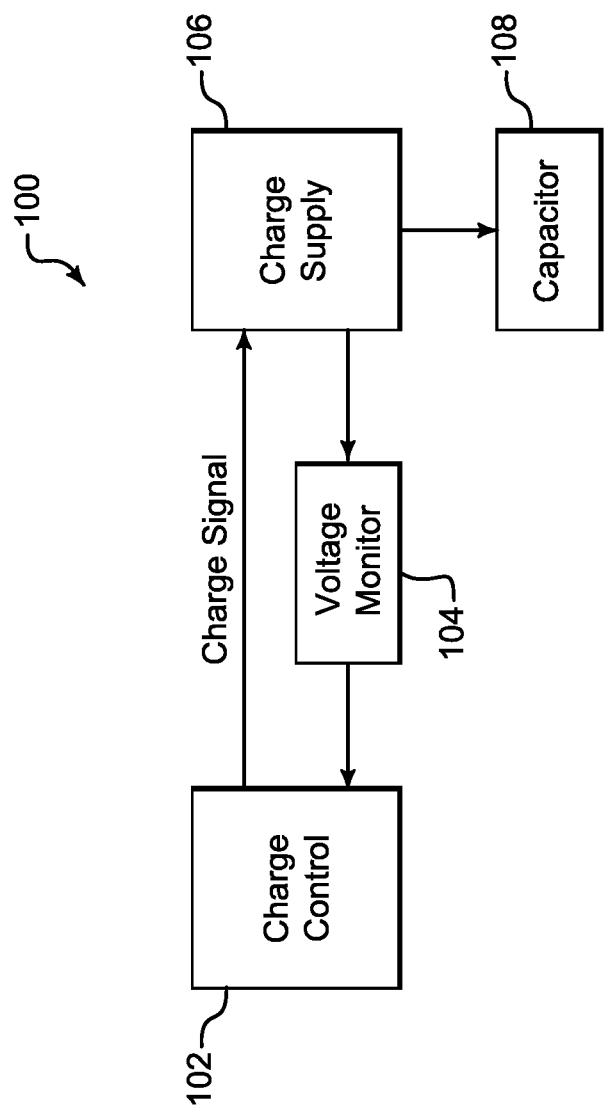
FIG. 10 is a schematic diagram of a charge control subsystem, according to one illustrated embodiment.

FIG. 10 shows a charge control subsystem 100, according to one illustrated embodiment. The charge control subsystem 100 includes a charge control unit 102, voltage monitor 104, charge supply 106 and charge storage such as one or more capacitors 108. The capacitor(s) 108 may, for example, take the form of one or more super- or ultra-capacitors. Control of capacitor voltage $V_C$ across the capacitor 108 is accomplished by the application of a charge control unit 102. The charge control unit is responsive to the voltage monitor 104 which monitors the voltage $V_C$ across the capacitor 108. The charge control unit 102 compares that voltage $V_C$ to a voltage set-point or threshold, for example, using solid state logic, and sends appropriate signal(s) to the charging power supply 106 to continue or discontinue charging the capacitor 108.

Figure 11:
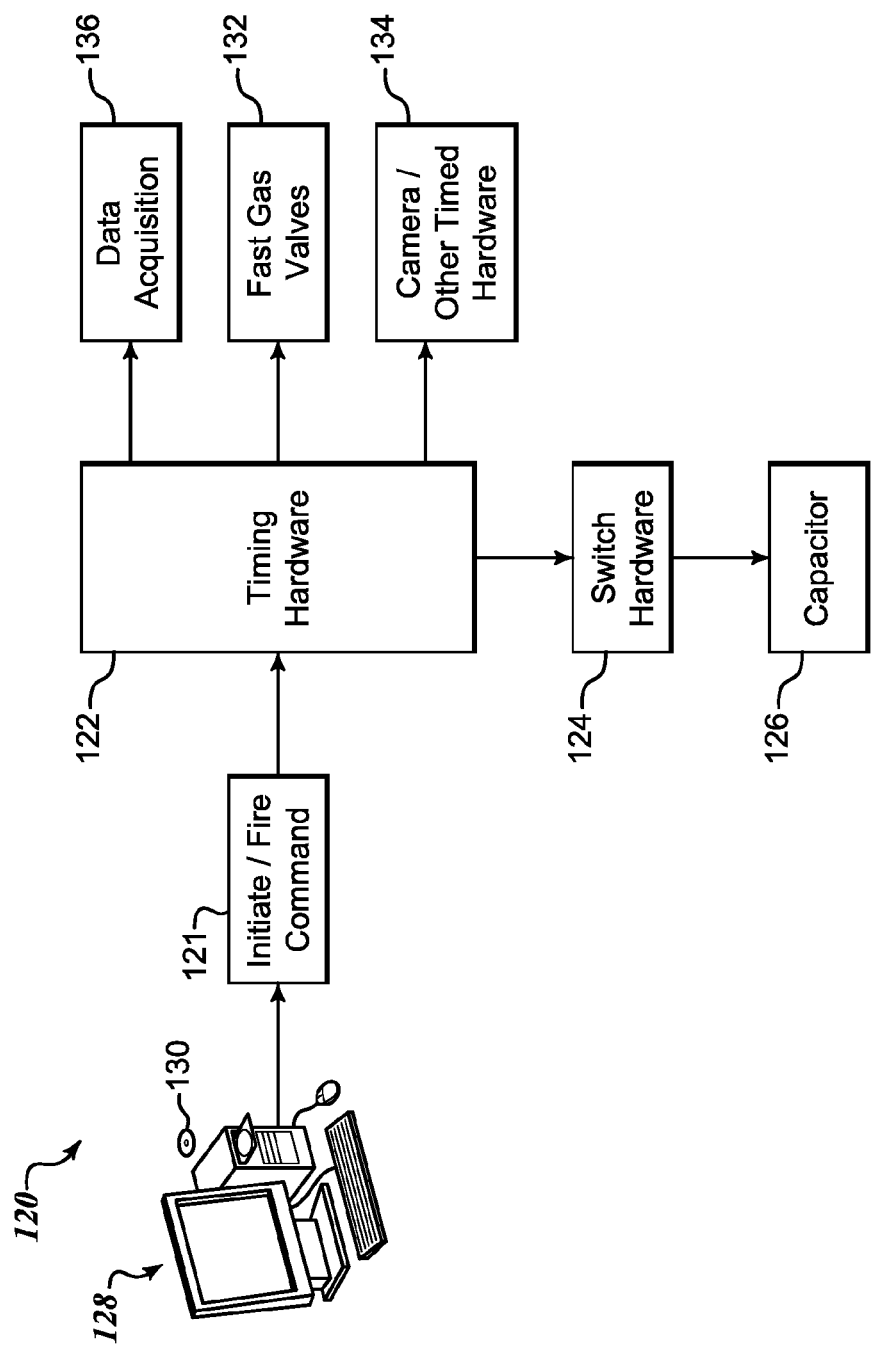
FIG. 11 is a schematic diagram of a control subsystem, according to one illustrated embodiment.

FIG. 11 shows a control subsystem 120, according to one illustrated embodiment. The control subsystem 120 may include timing hardware 122, switch hardware 124 and one or more capacitors 126. The timing hardware 122 may generate a trigger signal which can then be sent to the switch hardware 124 to initiate discharge of the capacitor 126. The trigger signal may be generated by conventional timing hardware, such as provided by National Instruments using PXI timing cards such as the National Instruments 6602 in a PXI chassis, such as the PXI-1045, or Jorway 221A Timing Module powered by a CAMAC crate. Both were deployed in IPA. Timing resolution is limited by the frequency of the timing clock. In the case of the Jorway 221A, the timing clock runs at 10 MHz resulting in a timing resolution of 0.1 microseconds.

The timing hardware 122 may be computer controlled using National Instruments Labview application program executing on a processor based computer system 128 such as personal computer (PC) or any other processor based device. In the software instructions stored on one or more computer-readable media 130 (e.g., optical disk, magnetic disk, RAM, ROM) and executed by one or more processors. The desired timing sequence may be programmed in a manner that will enable the timing hardware 122 to approximately replicate the timing of the transient magnetic fields that were used in the MHD code design. The software outputs commands 121 to control the timing cards, such as the Jorway 221A or a National Instruments 6602 which output a TTL level signal or similar bipolar logic signal. This logic signal can be used to directly trigger the switch hardware 124 on the appropriate capacitor. Alternatively, as is more usual, the logic signal may be used to trigger a light emitting diode (LED) which is then coupled to the switch hardware 124 through an optical fiber and a photodiode (PD) receiver. In this manner, many individual trigger signals may be sent to every switch on the apparatus, and can be controlled with 0.1 microsecond precision (or better if a faster timing clock is used). The trigger signals also control the timing of fast puff valves 132, arc discharge timing on the plasma source, as well as initiation of high speed camera 134 photography and data acquisition electronics 136.

Confirmation that the processes described above are obtained in the experiments is found in a detailed comparison between experimental data and the numerical MHD code results. An array of external flux and axial magnetic field probes are installed under each coil set (28, 18, 22, 32, and 30 from FIG. 1). From this array the excluded flux due to the presence of the FRC plasmoid is obtained, and the FRC plasmoid velocity, radius, length, and energy is determined. The same dynamic behavior of the FRC plasmoid formation, acceleration and velocity observed in the experiments is reproduced in the numerical calculations producing results similar to those shown in FIGS. 2 through 7. A Helium-Neon laser based interferometer measured the cross tube line density at the axial mid-plane, i.e., center of the interaction chamber coil 30. From this diagnostic and the magnetic measurements, the plasma density and pressure balance temperature is obtained. Deuterium plasmas are employed and calibrated neutron detectors are positioned radially outside the magnets at the chamber center to measure the D-D fusion neutron flux.

The merging and conversion of the supersonic FRC plasmoid (as determined from the ratio of the plasmoid motional energy to thermal energy), is observed to take place on the Alfvenic timescale. The two FRC plasmoids do not rebound and separate. Instead they merge sufficiently to form a plasmoid that functionally behaves as a single entity as indicated by the peak excluded flux appearing and remaining at the axial mid-plane. The basic equilibrium parameters observed during compression indicate a well-confined plasmoid with up to three times the confinement predicted by in-situ scaling (Equation (1)), proving evidence that adequate confinement for fusion can be obtained by this method. Total temperature is calculated based on radial pressure balance. During compression, evidence indicates that this results in total temperatures of 10 million ° K or more. The overwhelmingly larger ion mass compared to the electron dictates that the ions receive virtually all of the FRC plasmoid kinetic energy upon merging. A strong neutron signal is detected during magnetic compression from two shielded, scintillator-based neutron detectors. When corrected for FRC geometry, attenuation and scattering in intervening material, a much higher ion temperature ($T_i \sim 20$ million ° K) was inferred compared with magnetic compression from radial pressure balance with external axial magnetic field. The anomalously large signal is well beyond what can be attributed to measurement error of the plasma density and volume. The high temperature is most likely the result of a non-thermal ion population, but the mechanism for maintaining this over the FRC plasmoid lifetime is not known.

The magneto-kinetic acceleration, translation and compression of the FRC plasmoid provide a unique path to achieve the necessary high efficiency and simplicity. The singular ability of the FRC plasmoid to be translated over distances of several meters allows for the FRC formation and kinetic energy input for fusion burn to be accomplished outside of the interaction chamber 10 and breeding blanket 12 (see FIG. 5). In one embodiment, the divertor 14 may be removed from the FRC fusion reactor 5, eliminating the critical power loading issues faced in other fusion embodiments such as the tokamak.

Tritium flow is expected to be significantly improved in the embodiment of the fusion reactor 5 as shown in FIG. 1. The entire high field reactor vacuum flux 70 is external to FRC plasmoid flux 72 and is thus effectively diverted flux (see FIGS. 6 and 7). In a transient burn, the particle loss from the plasmoid is overwhelmingly directed to the divertor region in the divertors 14 as the axial flow time is many orders of magnitude smaller than the perpendicular particle diffusion time in the open flux region. By virtue of the cyclic nature of the burn, virtually all of the tritium can be introduced during the initial formation of the FRC plasmoids with no need for refueling. All tritium introduced can be conveniently recovered in the divertors 14 with each pulse. The ability to access the divertors 14 remotely in an essentially neutron free environment makes prospects for near unity tritium recovery much more feasible.

The ability of the FRC plasmoids 20 to be translated over distances of several meters allows for the FRC plasmoid formation and addition of kinetic energy for heating to be realized outside of the interaction chamber 10 and breeding blanket 12. The high energy density state is obtained through both compression and the rapid conversion of the FRC plasmoid axial kinetic energy. Compression occurs during acceleration by increasing the magnetic field 52 (see FIG. 5), and reducing the radius of accelerator coils 22. Compression also occurs through self compression converting FRC plasmoid axial motion as the FRC plasmoids are injected into a convergent magnetic field 24 (see FIG. 2), and finally by magnetic compression from the interaction chamber axial magnetic field 72 (see FIG. 7).

Employing magnetic fields in this way provides for a means to achieve high electrical efficiency in heating and compression the plasmoid. By having the compression be reversible, it is also the key to directly recovering the magnetic and plasmoid energy that was used to create the fusion condition initially. Most importantly, this energy recovery occurs in a manner that restores the energy back into the same form that it was initially, i.e. it is electrical in nature and does not suffer from the unavoidable energy losses associated with thermal conversion. Devices that can operate in this way are referred to as direct energy converters. The energy recovery is a natural consequence of operating the magnets in an oscillatory mode. Energy introduced in compressing and heating the plasmoid is recovered back into the energy storage system (e.g. capacitors). Once the energy has been returned, the circuit is opened to prevent the energy from flowing back into the coils at an inappropriate time. Although there are other electronic means that could be used to achieve this, the current interruption is most readily accomplished in a low loss manner by the inclusion of a high power diode array in the circuit.

This cyclic process could ideally be done in a manner that entailed no losses, with the result being no net energy consumed in creating the fusion energy. The energy gain of such a system would be essentially infinite. In reality there are always some Ohmic losses in the circuits as well as plasma loss during the process. The energy loss from the plasmoid can be more than compensated for by the production of high energy fusion alpha particles within the plasmoid. The push back on the magnetic circuit from this additional component of pressure produced by the alpha particles energizes the circuit by doing work on the magnetic compression fields. The fusion alpha energy can be directly converted into stored electrical energy in this way.

The plasma loss during the fusion burn can also be extracted in the divertor regions at each end of the device. This can be accomplished by having this directed stream of plasma do work on a magnetic field introduced into this region for this purpose.

To make a significant impact on world energy needs, the energy yield must be substantially increased from the scale of the proof-of-principle experiments conducted using the embodiments described above. In another embodiment of the PED, the scale increases by roughly a factor of three, increasing the plasma temperature by roughly a factor of four. In this embodiment, the plasma temperature required for optimum operation as a fusion reactor is approximately 80 million ° K. A significant advantage of this method is that due to its simplicity and the ease with which it can be scaled. The method also reduces the time and cost to develop specific embodiments. By one development path, the final device is approached incrementally by scaling up previously built devices.

Figure 9:
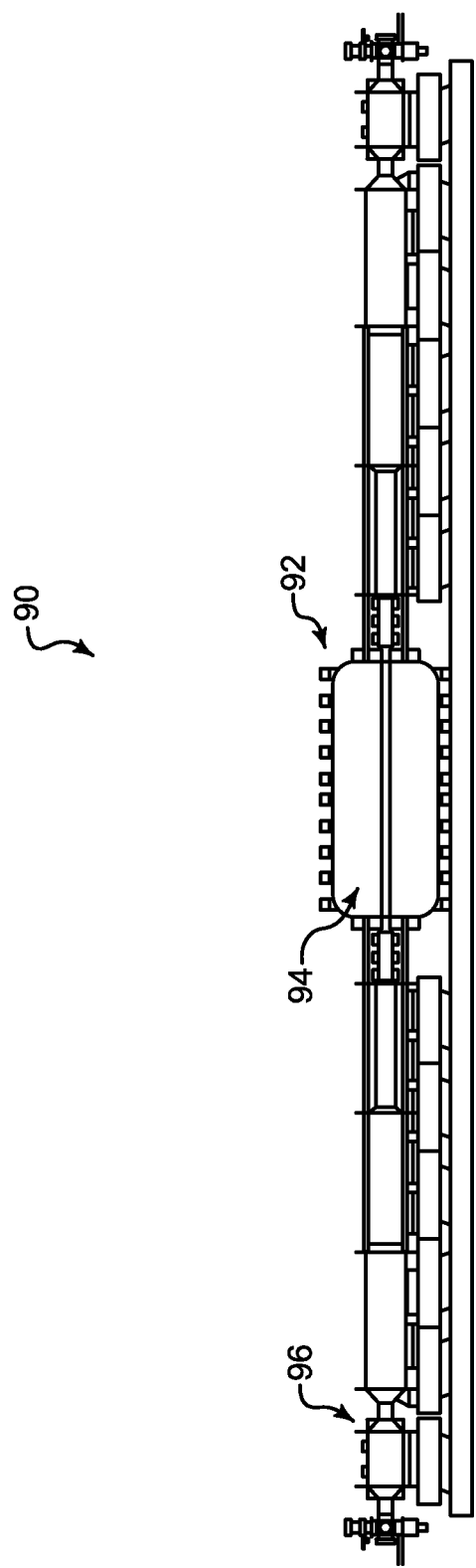
FIG. 9 is a schematic diagram depicting an advanced device according to another non-limiting embodiment.

Due to the unique geometry and simplicity of the concept, there are immediate applications for the device even at the level of development attained in the prototype. The fusion reaction creates a copious supply of high energy neutrons, and the unique device geometry makes these neutrons very available for conversion in the blanket 94 surrounding the device (see FIG. 9). As previously discussed, in one embodiment these neutrons are used for the production of more fuel (tritium) for continued operation of the reactor as well as the startup of new, future reactors. Due to the high conversion efficiency of the reactor configuration, surplus neutrons absorbed in the blanket with the generation of heat can be converted to electricity through a conventional steam cycle or other heat engines. However, these energetic neutrons have potentially more valuable uses than heat generation. These neutrons can be employed in a transformational manner, for example to produce rare isotopes or initiate the process of the conversion of one element into another. These roles for the fusion neutrons, particularly for applications that enable alternate forms of energy generation, are the focus of an alternative embodiment of the prototype. In fact, in one embodiment the prototype device meets the requirements of an efficient and high fluence neutron source demanded for alternate methods of energy generation. With the device prototype employed for its neutron production capabilities, the energy yield is determined by the energy that can be released from the by-products created by the fusion neutrons, rather than from fusion energy alone. In this manner the prototype performs as an energy amplifier; the fusion energy gain is no longer critical because the fuel the prototype creates has the potential for creating far more energy. In this embodiment, the device need not be developed beyond the near breakeven conditions sought in the prototype to have a major impact on energy generation.

A compact neutron source in the form of the devices described herein, as one application, may facilitate the transitioning of the current nuclear industry away from fission of uranium to a different cleaner and safer fuel. The alternate fuel cycle may be based on thorium. With a thorium-based nuclear fuel, fission-based nuclear power delivers what the current uranium fission-based reactor cannot: abundant, safe, and clean energy with no long-lived high-level radioactive waste, and essentially no chance for proliferation. These benefits are achievable with little or no modification to existing reactors.

Thus, embodiments of a ground-breaking method and means for heating and compressing plasmas to thermonuclear temperatures and densities have been disclosed. The implementation according to the various embodiments disclosed herein provides several advantages over other known plasma implementations. For instance, the disclosed embodiments provide methods for forming and heating plasma to thermonuclear conditions and for efficiently forming and repetitively heating and compressing the FRC plasmoid. Moreover, it is believed that an apparatus according to the various embodiments will permit the construction of power generating thermonuclear reactors that are significantly smaller and less expensive than currently planned devices according to other known plasma implementations. The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other context, not necessarily the disclosed context of fusion generally described above. It will be understood by those skilled in the art that, although the embodiments described above and shown in the figures are generally directed to the context of fusion, applications related to a thorium fuel generator or a waste burner, for example, may also benefit from the concepts described herein.

While many aspects of the methods and apparatus are set out in the summary and the claims as discrete sub-acts or subcomponents (e.g., dependent claims), one of skill in the art will appreciate that any one or more of these sub-acts or sub-components (e.g., limitations of the dependent claims) may be combined with the overall method or components (e.g., limitations of the independent claims), and that the remaining sub-acts or subcomponents (e.g., limitations of remaining dependent claims) may include those other sub-acts or components. Thus, any of the limitations of the dependent claims may be incorporated into the respective independent claim, and the remaining dependent claims that depend from that amended independent claim would include such limitations.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A method of moving field reversed configuration (FRC) plasmoids, each of the FRC plasmoids a respective coherent structure of plasma and magnetic fields, the method comprising:
   forming a first FRC plasmoid in a first plasmoid formation section;
   forming a second FRC plasmoid in a second plasmoid formation section;
   increasing a velocity and a kinetic energy of the first and the second FRC plasmoids that are initially separated from one another by a first compression section, a second compression section, and an interaction chamber located between the first compression section and the second compression section,
      wherein the velocity and the kinetic energy of the first FRC plasmoid is increased by magnetically accelerating the first FRC plasmoid with an increasing magnetic field established by a first plurality of accelerator coils disposed around the outside of the first compression section so that the first FRC plasmoid moves through the first compression section that is defined by an axial radius that decreases in the direction of movement of the first FRC plasmoid towards the interaction chamber,
      wherein the velocity and the kinetic energy of the second FRC plasmoid is increased by magnetically accelerating the second FRC plasmoid with an increasing magnetic field established by a second plurality of accelerator coils disposed around the outside of the second compression section so that the second FRC plasmoid moves through the second compression section that is defined by an axial radius that decreases in the direction of movement of the second FRC plasmoid towards the interaction chamber,
      wherein each of the first and the second FRC plasmoids move relatively towards each other into an interaction chamber, and
      wherein the first and second FRC plasmoids have a respective initial temperature, kinetic energy, and total energy;
   concurrent with the increasing of the velocity and the kinetic energy of the first and the second FRC plasmoids, compressing each of the first and the second FRC plasmoids with the increasing magnetic field;
   confining an interaction of the first and the second FRC plasmoids in the interaction chamber at a higher temperature than either of the respective initial temperatures of the first and the second FRC plasmoids,
   merging the first and the second FRC plasmoids together during the interaction forming a magnetically isolated plasmoid; and
   collecting at least one of heat, tritium, helium 3, fissile fuel, and medical isotopes resulting from interaction of neutrons produced by reaction of the first and the second FRC plasmoids in the interaction chamber with a blanket of material proximate the interaction chamber.

2. The method of claim 1, further comprising:
   causing the first and the second FRC plasmoids to produce the slower moving resultant magnetically isolated plasmoid in the interaction chamber to convert the kinetic energy of the first and the second FRC plasmoids into thermal energy, thereby increasing the temperature.

3. The method of claim 1 wherein the interaction chamber defines a volume, the method further comprising:
   forming the first FRC plasmoid outside the volume of the interaction chamber; and
   forming the second FRC plasmoid outside the volume of the interaction chamber.

4. The method of claim 3 wherein forming the first and the second FRC plasmoids outside the volume of the interaction chamber includes forming the first FRC plasmoid while at the same time beginning the accelerating of the first FRC plasmoid, and forming the second FRC plasmoid while at the same time beginning the accelerating of the second FRC plasmoid.

5. The method of claim 3 wherein forming the first and the second FRC plasmoids outside the volume of the interaction chamber includes forming the first FRC plasmoid while at the same time beginning the accelerating and compressing of the FRC first plasmoid, and forming the second FRC plasmoid while at the same time beginning the accelerating and compressing of the second FRC plasmoid.

6. The method of claim 3 wherein the first and the second FRC plasmoids outside the volume of the interaction chamber comprises dynamically forming each of the first and the second FRC plasmoids by using a respective annular array of plasma sources and activating a series of magnetic coils in sequence about small plasmoids discharged from the annular array of plasma sources.

7. The method of claim 3 wherein forming the first and the second FRC plasmoids outside the volume of the interaction chamber comprises forming each of the first and the second FRC plasmoids by activating a respective series of independently-triggered magnetic coils in sequence.

8. The method of claim 1, further comprising:
   sequentially reversing flux generated by a plurality of coils to dynamically form each of the first and the second FRC plasmoids.

9. The method of claim 1 wherein increasing a velocity of the first and the second FRC plasmoids includes activating a series of magnetic coils in sequence to accelerate the first and the second FRC plasmoids, the thermal energy of the resultant magnetically isolated plasmoid including components of the conversion of a respective kinetic energy from the acceleration of the first and the second FRC plasmoids.

10. The method of claim 1 wherein increasing a velocity of the first and the second FRC plasmoids includes simultaneously compressing and accelerating the first and the second FRC plasmoids by activating a series of magnetic coils in sequence.

11. The method of claim 10 wherein the series of magnetic coils have a smaller radius than a preceding one of the magnetic coils in the series in the direction towards the interaction chamber.

12. The method of claim 1, further comprising:
heating and compressing the first and the second FRC plasmoids simultaneously by self compression into a radially converging and increasing magnetic field.

13. The method of claim 1, wherein after the merging of the first and the second FRC plasmoids, the magnetically isolated plasmoid reaches equilibrium.

14. A method of merging a first moving field reversed configuration (FRC) plasmoid and a second FRC plasmoid into a magnetically isolated plasmoid, comprising:
forming and moving the first FRC plasmoid, comprising:
introducing a gas into a first plasmoid formation section;
reverse biasing a plurality of first formation coils disposed about an outer perimeter around the first plasmoid formation section to compress the gas in the first plasmoid formation section into the first FRC plasmoid;
sequentially forward biasing each of the plurality of first formation coils to accelerate the first FRC plasmoid in the first plasmoid formation section to exit out of the first plasmoid formation section;
receiving the first FRC plasmoid exiting the first plasmoid formation section into a first end of a first acceleration/compression section; and
sequentially forward biasing each of a plurality of first acceleration coils of the first acceleration/compression section to accelerate and compress the first FRC plasmoid received from the first plasmoid formation section, wherein the first FRC plasmoid is moved from the first end of the first acceleration/compression section to a second opposing end of the first acceleration/compression section so that the first FRC plasmoid exits from the first acceleration/compression section;
forming and moving the second FRC plasmoid, comprising:
introducing the gas into a second plasmoid formation section;
reverse biasing a plurality of second formation coils disposed about an outer perimeter around the second plasmoid formation section to compress the gas in the second plasmoid formation section into the second FRC plasmoid;
sequentially forward biasing each of the plurality of second formation coils to accelerate the second FRC plasmoid in the second plasmoid formation section to exit out of the second plasmoid formation section;
receiving the second FRC plasmoid exiting the second plasmoid formation section into a first end of a second acceleration/compression section; and
sequentially forward biasing each of a plurality of second acceleration coils of the second acceleration/compression section to accelerate and compress the second FRC plasmoid received from the second plasmoid formation section, wherein the second FRC plasmoid is moved from the first end of the second acceleration/compression section to a second opposing end of the second acceleration/compression section so that the second FRC plasmoid exits from the second acceleration/compression section;
receiving the first FRC plasmoid exiting the first acceleration/compression section into an interaction chamber;
receiving the second FRC plasmoid exiting the second acceleration/compression section into the interaction chamber; and
colliding and merging the first FRC plasmoid and the second FRC plasmoid with each other in the interaction chamber forming the magnetically isolated plasmoid.

15. The method of claim 14, wherein after the merging of the first and the second FRC plasmoids, the magnetically isolated plasmoid reaches equilibrium.

16. The method of claim 14, wherein at least one of heat, tritium, helium 3, fissile fuel, and medical isotopes resulting from interaction of neutrons produced by reaction of the first FRC plasmoid and the second FRC plasmoid in the interaction chamber becomes collectable from the interaction chamber.

17. The method of claim 14, wherein introducing the gas into the first plasmoid formation section comprises operating a plurality of first puff valves to introduce the gas into the first plasmoid formation section, and wherein introducing the gas into the second plasmoid formation section comprises operating a plurality of second puff valves to introduce the gas into the second plasmoid formation section.

18. The method of claim 14, wherein introducing the gas into the first plasmoid formation section and the second plasmoid formation section comprises introducing Deuterium gas into the first plasmoid formation section and the second plasmoid formation section.

* * * * *